United States Patent [19]
Alford

[11] Patent Number: 5,634,196
[45] Date of Patent: May 27, 1997

[54] RADIO CALL HISTORY LIST

[75] Inventor: George C. Alford, Plano, Tex.

[73] Assignee: Uniden America Corporation, Ft. Worth, Tex.

[21] Appl. No.: 325,582

[22] Filed: Oct. 19, 1994

[51] Int. Cl.⁶ .................................................. H04B 1/40
[52] U.S. Cl. .......................... 455/54.2; 455/54.1; 455/89; 455/186.1
[58] Field of Search .................. 455/54.1, 33.1, 455/34.1, 186.1, 185.1, 89, 54.2, 69, 88; 379/58, 59

[56] References Cited

U.S. PATENT DOCUMENTS

| | | | |
|---|---|---|---|
| 5,134,717 | 7/1992 | Sogaard Rasmussen | 455/89 |
| 5,203,015 | 4/1993 | George | 455/186.1 |
| 5,251,250 | 10/1993 | Obata et al. | 455/54.1 |

Primary Examiner—Reinhard J. Eisenzopf
Assistant Examiner—Doris To
Attorney, Agent, or Firm—Daniel R. Brown

[57] ABSTRACT

A method and two-way radio apparatus are disclosed which provide for the storage and recollection of call history information, in a call history memory, based on a system ID codes and group ID codes which are linked to receive ID codes and transmit ID codes in an ID code memory. The call history memory may be arranges as a FIFO queue, and calls may be automatically replied to upon reviewing the contents of the call history memory.

17 Claims, 8 Drawing Sheets

RADIO CALL HISTORY LIST

TECHNICAL FIELD OF THE INVENTION

This invention pertains to radio communications equipment. In one embodiment, a two-way radio maintains a call history list.

BACKGROUND OF THE INVENTION

Radio communications receivers commonly receive and decode messages which contain information. A part of this information may be an identity for the intended recipient or recipients of a given call. A radio, upon decoding valid identity information, will receive a call. For example a radio may unsquelch its receiver and pass audio signals to a loudspeaker upon receipt of a valid identity. Conversely, radios commonly transmit a message having identity information so that other radios intended to receive a given call can receive and decode the transmitted identity information.

Modern radios transmit and receive messages in the form of digital data. Such date is modulated onto a radio frequency carrier which is used to accomplish radio communications. A portion of any given message may he the aforementioned identity information. This information is commonly called an ID code. A transmit ID code is transmitted by the transmitting radio, which is received as a receive ID code by the receiving radio. A single given radio may or may not use different transmit ID codes and received ID codes, depending on what other radios the given radio is attempting communications with.

A radio that is capable of both transmitting and receiving is known as a two-way radio. Such radios may operate in the simplex, half-duplex, and full-duplex modes of operation. These modes of operation are well known in the art. A simplex radio transmits and receives on one frequency during a call and is not capable of simultaneously transmitting and receiving. Rather, transmissions and receptions must be multiplexed in time in order to have a conversation.

A half-duplex radio is capable of transmitting and receiving on a pair of two different frequencies, and, like a simplex radio is not capable of simultaneously transmitting and receiving. A full-duplex radio operates on a pair of two different frequencies and is capable of simultaneously transmitting and receiving.

Both half-duplex and full-duplex radios are capable of operating through a radio repeater. A repeater is a radio transmitter and receiver pair which receive signals from radios and retransmit them to other radios. Radio repeaters, or repeaters, typically include a control unit for controlling their operation. One benefit of a repeater is that it can be located at a high elevation and operated at high power. This serves to extend the radio coverage range to a greater geographic area than would be available if two radios were to communicate directly with each other. For example, radios are typically deployed in the form of mobile radios for use in motor vehicles and the like or in the form of hand-held portable radios. In either case, size, power and elevation limitations would prevent these radios from communicating over long ranges or large geographic areas.

Often times, repeaters are shared between a large number of radio users. Many times, radios users are grouped together so that users with common communications needs can effectively communicate with each other. In some situations two radios are grouped together to provide for one to one communications. Alternatively, several radios may be grouped together. In situations where several radios are grouped together, a single radio will transmit messages to the remainder of the group. These radio groupings are called radio fleets. The one to one calls are called private calls and the one to many calls are called dispatch calls. A single radio may be a member of more than one group. For example, a single radio user may desire to have private calls in some instances and dispatch calls in other instances. Furthermore, any given radio may be a member of several private groups and/or dispatch groups. Another application of radios and repeaters is to interconnect a repeater to the Public Switched Telephone Network, (PSTN). With an interconnected repeater, a radio may communicate with the repeater via radio signals and further communicate with a telephone user via wires in the PSTN. Radios operating in the interconnected environment can place call into the PSTN or receive calls that originate in the PSTN. These calls are commonly known as interconnect calls.

In radio environments where there are a very large number of individual radio users, a single repeater may not be sufficient to provide an adequate degree of service. The Federal Communications Commission rules allow for the trunking of two or more repeaters together to form a trunked groups of repeaters, also called a repeater system. These repeater systems employ a trunking signaling protocol which allow the management of individual repeaters in real time. This trunking information is often times a part of the radio messages transmitted between radios and repeaters.

Transmit ID codes and receive ID codes are used to identify the transmitting and receiving radios in the various groupings as described above. Transmit and receive ID codes are usually transmitted as binary numbers and they are sometimes represented as base ten numbers. System operators who program ID codes, sell radios, and service radios become technically experienced with ID code usage and their limitations. However, to end users of radios, these ID codes can be confusing and difficult to work with. Yet it is still important for the end user to identify which dispatch fleet or private group the end user is calling or is to be called. Radios usually have a selection means, such as a push button or rotary knob for selecting a communications group which is specified by a group ID code. An association is often made between group ID codes and transmit ID codes and receive ID codes so that end users can simply select a familiar, simple group ID code which is ultimately linked to the appropriate transmit ID and receive ID needed to accomplish the desired communications.

In one example, a simple system has been devised that links group ID codes one through ten to pairs of a transmit ID's and a receive ID's. The radio user simply remembers, for example, that group 1 places a certain private call, group 2 places a telephone interconnect call, group 3 places a dispatch call, and etc. While receiving calls, the users radio may be enabled to scan all of the aforementioned receive ID's so that receipt of any one of them in a data message will cause the call to be received. When a call is received, the radio may display the familiar group ID code so that the radio user can identify the calling group. Of course, other transmit ID codes and receive ID codes could be used, such as alpha-numeric characters, for example, that identify radio groups with words, numbers or mnemonics.

In partial summary, group ID codes are used to specify and identify specific transmit ID's and receive ID's for the purpose of controlling what group or fleet is being communicated with.

A described earlier, repeaters offer radio coverage over a larger geographic area than is possible with direct radio to radio communications. However, this does not mean that the coverage area is without limits. For various reasons that are well know in the art, repeaters also have finite coverage area. To offer even larger coverage area, operators of radio repeater systems may operate two or more repeater systems and offer service to individual radios on more that one repeater system.

Multiple repeater systems are often located in separate geographic areas. As a user of a radio moves from area to area, it is necessary to select the repeater system on which to initiate calls. Conversely, the radio must be tuned to a frequency of one of the repeaters in the local system in order to receive a call. Radios have been devised with a system scan feature which causes the radio to scan several frequencies of repeaters that are located in different repeater systems. While monitoring any particular repeater frequency, the radio also scans for particular receive ID codes which would indicate that a desired call is to be received.

In a similar fashion to the identification of particular transmit and receive ID codes with a group ID code, repeater systems are identified with a simple system ID code. For example, system ID codes may be numbered from one through ten to identify up to ten separate repeater systems, each of which may have one or more repeaters. Again, the radio user simply need remember, for example, that system 1 is used downtown, system 2 is used north of town, system 3 east of town, and etc.

It is now understood that a user of a radio selects a system to identify the repeater system, or geographic area, to communicate in, and a group to identify with whom the communications is to be had. Likewise when a call is received, a radio may display the system and group numbers which will identify the repeater system being used and which particular radio or group of radios is calling.

Modern radios have controllers which allow them to function with very little user intervention. Calls can be received automatically and the response to a call usually only requires the press of a single button. Such an automated system functions well if the radio user is present at the radio to communicate in a conversation. However, often times, the radio user is away from the radio while a call is received. Even while the user is away from the radio, the radio will scan systems and groups, received and decode data messages into ID codes, unsquelch the receiver, receive the call, and etc. However, all this information is meaningless if the users does not listen to, interpret, and/or respond to it. Upon the user's return to the radio, the user is unaware of the missed call, and therefore, communications is not completed. Since the main benefit of two-way radios is to improve the accessibility to communications for the end user, and since a missed called reduces the desired accessibility, clearly there is a need to provide a greater amount of call history detail to users of two-way radios, thus improving the accessibility to communications for the end user.

SUMMARY OF THE INVENTION

The present invention discloses a method and apparatus for storing and recalling call history information in a two-way radio. Further, recalled call history information can be used to automatically reply to a call. This novel capability allows a user of a radio to review a list of calls that have been received by a radio. This list of calls is a call history list and allows a radio user to acknowledge and, optionally, to respond to calls which were received during his absence.

As call data messages are received by the radio, receive Id codes are decoded from the messages by a controller. Also, during the reception of a call, the controller makes note of the current system ID code. The receive ID code is used to locate a corresponding group ID code that is stored in an ID code memory in the radio. The group ID code is located by virtue of its linked relationship with the receive ID code and system ID code. The group ID code and system ID code are stored in a call history memory, which may be arranged as a first-in first-out, (FIFO), queue. As each new call is received, the corresponding system ID code and group ID code are pushed into the call history memory FIFO queue and the oldest call in the queue is deleted.

It is common for a conversation to include multiple calls to and from the same transmit and receive ID codes. As described earlier, these ID codes will correspond to the same group ID and system ID in every call. This being the case, the call history memory can quickly fill with the same group ID code and system ID code, and otherwise useful call history information would be lost. To alleviate this problem, the present invention provides that the controller compare the system ID code and group ID code of each newly received call with the value of the most recently stored system ID and group ID in the call history memory FIFO queue. If equality is found, then the newly received call is not added to the memory. However, if another radio user is repeatedly trying to contact a radio, his corresponding system ID and group ID can appear as every other entry in the call history memory. This arrangement can communicate the urgency of repeated call attempts to a radio.

All of the foregoing storage of call history information in the call history memory is accomplished automatically, in the absence of the radio user. Upon the user's return to the radio, the present invention provides a user interface necessary to accomplish the review of the stored call history information. A first actuator is provided which is used in conjunction with a display. The display is suitable to display system ID codes and group ID codes. Actuation of the first actuator causes the controller to recall a first system ID code and group ID code from the call history memory, and display the information on the display. Subsequent actuations of the first actuator cause the controller to sequentially recall and display all of the call history entries from the call history memory. In the preferred embodiment, after the last entry in the call history memory has been displayed, the next actuation of the first actuator will cause the radio to return to a default standby state, from which other functions can occur.

When the user views a system ID code and group ID code that are recognized as a call to which a reply call is warranted, a second actuator is provided which causes the controller to place the reply call. When the second actuator is actuated, the controller searches the ID code memory for a reply transmit ID code which is linked to the recalled, or reply, system ID code and group ID code. Further, the controller uses the recalled system ID code to index a pointer to a system information memory. The system information memory contains indicia of transmit frequencies which are used to tune the radio to the appropriate transmit frequencies of the repeaters in the selected system. The reply transmit ID code is encoded into a call data message that is transmitted by a transmitter portion of the transceiver in the radio. The transmission of the call data message initiates a call to the desired system ID code and group ID code, thus replying to the memorized call.

BRIEF DESCRIPTION OF THE DRAWINGS

The features of the present invention which are believed to be novel are set forth with particularity in the appended claims. The invention, together with further objects and advantages thereof, may be best understood by making reference to the following description taken in conjunction with the accompanying drawings, in the several figures of which like reference numerals identify identical elements, and wherein:

DETAILED DESCRIPTION

Figure 1:
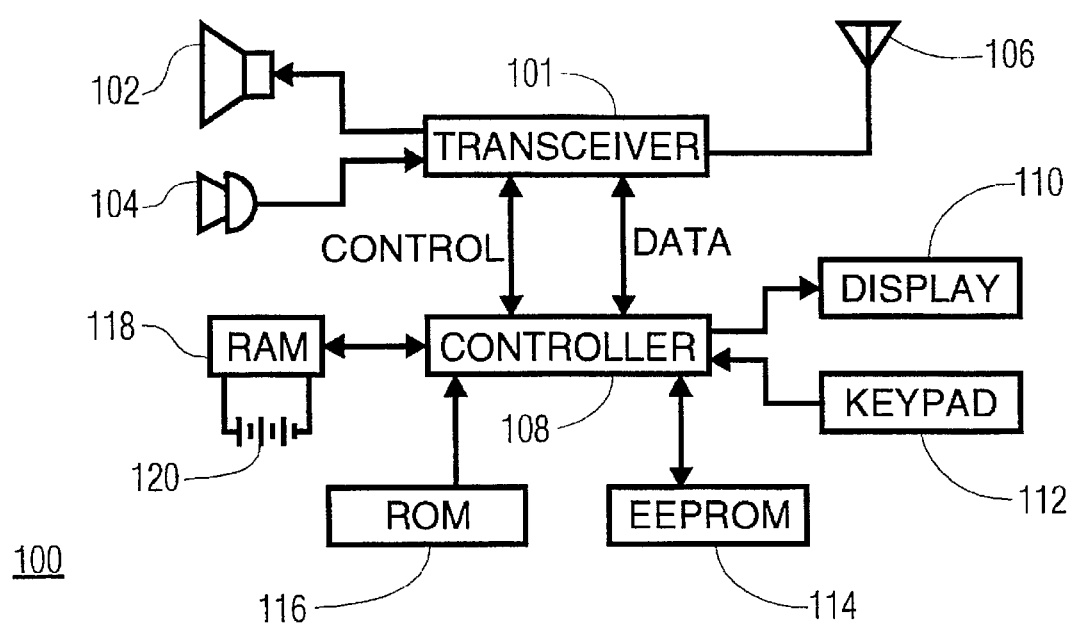
FIG. 1 is an electrical block diagram of the preferred embodiment.

Reference is directed to FIG. 1 which is an electrical block diagram of the two-way radio in the preferred embodiment of the present invention. The radio 100 includes a transceiver 101 which further includes a transmitter portion, a receiver portion and a phase lock loop frequency synthesizers (each not shown). The transceiver further includes the necessary audio and radio frequency circuitry to enable the interface to a loud speaker 102, microphone 104, and antenna 106. As such, the transceiver is a frequency agile transmitter and receiver designed to operate in the appropriate frequencies as allocated by the Federal Communications Commission for Land Mobile Radio Service. Such transceivers are well known in the art.

The radio further includes a controller 108 which is interfaced to, and controls the transceiver 101 and also controls to transfer data back and forth between the transceiver 101 and the controller 108. The controller is interfaced to a user interface which includes a display 110 and a keypad 112. The display 110 includes numeric digits and icons which are used to inform the user about the operational status of the radio. The keypad includes several keys including numerical digits 0 through 9 and other specialized function keys to allow entry of data into the radio. The controller 101 is of typical design available from many integrated circuit vendors and includes an 8-bit microprocessor with internal memory and various input and output circuits as may be required for a particular radio design. The use of such controllers is well known in the art.

The two-way radio includes an electrically erasable programmable read only memory, (EEPROM) 114, which is used to store programmable, nonvolatile variables. This memory also includes the ID code memory which stores system ID codes, group ID codes, transmit ID codes and receive ID codes, and the system information memory area. An electrically erasable PROM is desirable because it allows for nonvolatile storage of these variables when power is disconnected from the radio yet still allows the controller to program changes when necessary. The radio includes a read only memory, (ROM), 116 which is used store the object code software that gives the radio its personality and overall functionality. A random access memory, (RAM), 118 is included and is used to store the call history memory and other real-time variables. The RAM 118 has a battery 120 attached to provide short term back-up in the event of power loss.

Figure 2:
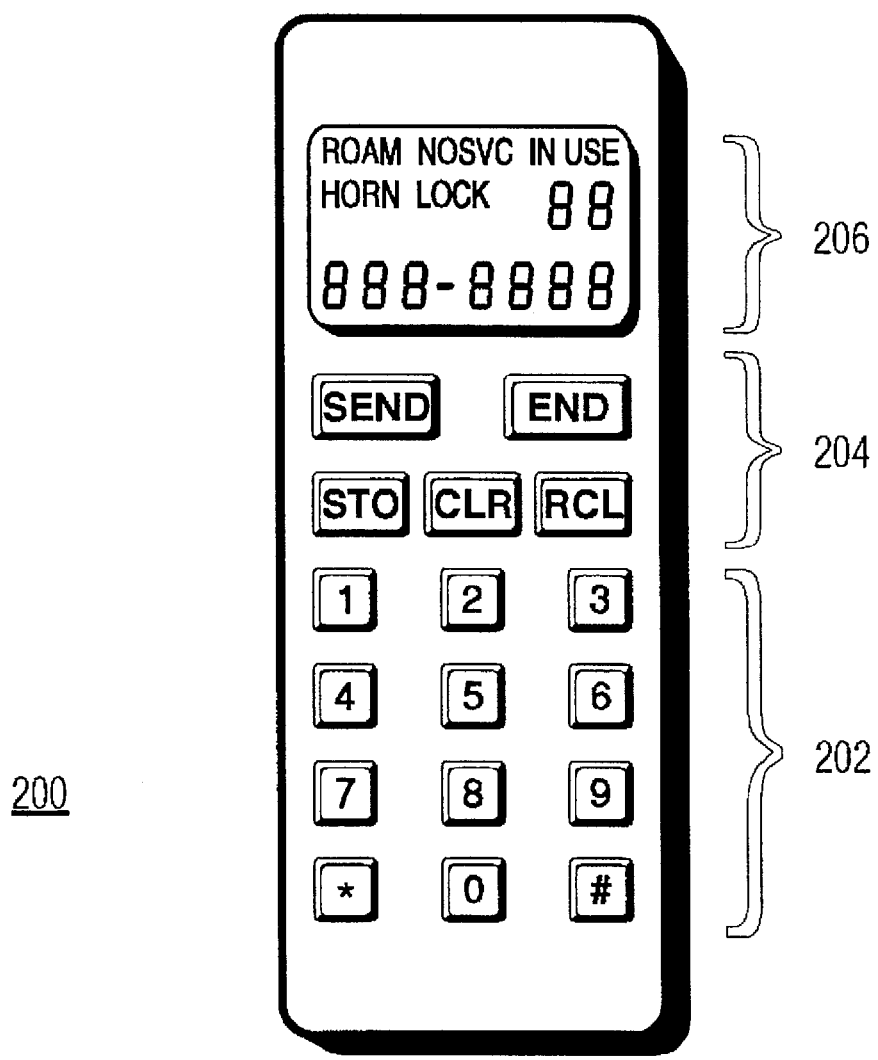
FIG. 2 is a diagram of the user interface in the preferred embodiment.

Reference is directed to FIG. 2, which is a diagram of the user interface of the radio in the preferred embodiment. Generally the user interface 200 is divided into three sections which include the numeric keypad 202, the function key area 204 and the display 206. The numerical keypad 202 comprises keys that range from "0" through "9", an "*", and the "#" key. These keys are of conventional design as those used in a conventional telephone. The function key area 204 includes a "SEND" key for initiating calls, an "END" key for terminating calls, a "STO" key, a "CLR" key, and a "RCL" key. Relevant uses of the function keys will be described in more detail hereinafter. The display area of the user interface 206 includes several icons which include "ROAM", "NO-SVC", "IN-USE", "HORN", and "LOCK". Further included are ten seven-segment numeric display digits and a "–" The numeric display digits can also be used to display system ID codes, group ID codes and also telephone numbers to be dialed, and so forth.

The keys in the keypad are arranged in a conventional key matrix and are interfaced to the controller, 108 FIG. 1. The display is also interfaced to the controller so that the controller can write characters and illuminate the various icons. Such interface designs are well known in the art.

Figure 3A:
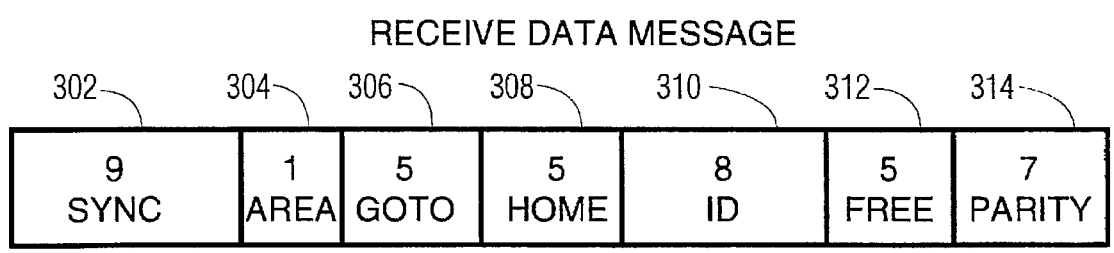
FIGS. 3A and 3B are data diagrams of the data message frames in the preferred embodiment.
Figure 3B:
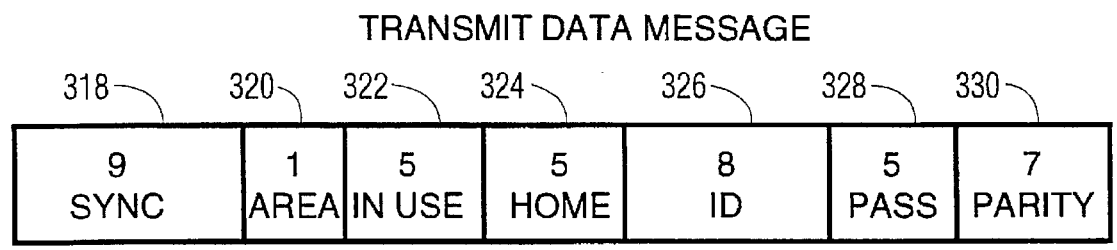

Reference is directed to FIGS. 3A and 3B which are data diagrams of the call data messages transmitted to and from the radio in the preferred embodiment. The receive call data message 300 in FIG. 3A is in accordance with a industry standard called the Logic Trunked Radio, or "LTR", format as defined by the E. F. Johnson Company, Waseca, Minn. The call data message includes a 9-bit synchronization, "SYNC", field 302. A 1-bit "AREA" field 304 is also included, a 5-bit "GOTO" repeater field 306 is included which instructs the radio which repeater channel in a trunking system a call is to be received on thus defining the frequency of operation. A 5-bit "HOME" repeater field 308 is included which indicates the repeater number or channel on which the radio is normally homed and listens while it is in the standby state. This is conventionally known as the "HOME" repeater. An 8-bit "ID" code 310 is also included. The combination of the 5-bit "HOME" repeater field 308 and the 8 bit "ID" field 310 together create the receive ID code that is used in the preferred embodiment. When a call data message is received by the radio the "HOME" repeater and "ID" field are extracted and form the receive ID code. Also, the received data message 300 includes a 5-bit "FREE" repeater field 312 which indicates which repeater in a trunking system is currently available to initiate communications on. Finally, a 7-bit "PARITY" field 314 is included for the purpose of detecting errors in a call data message transmission.

Figure 4:
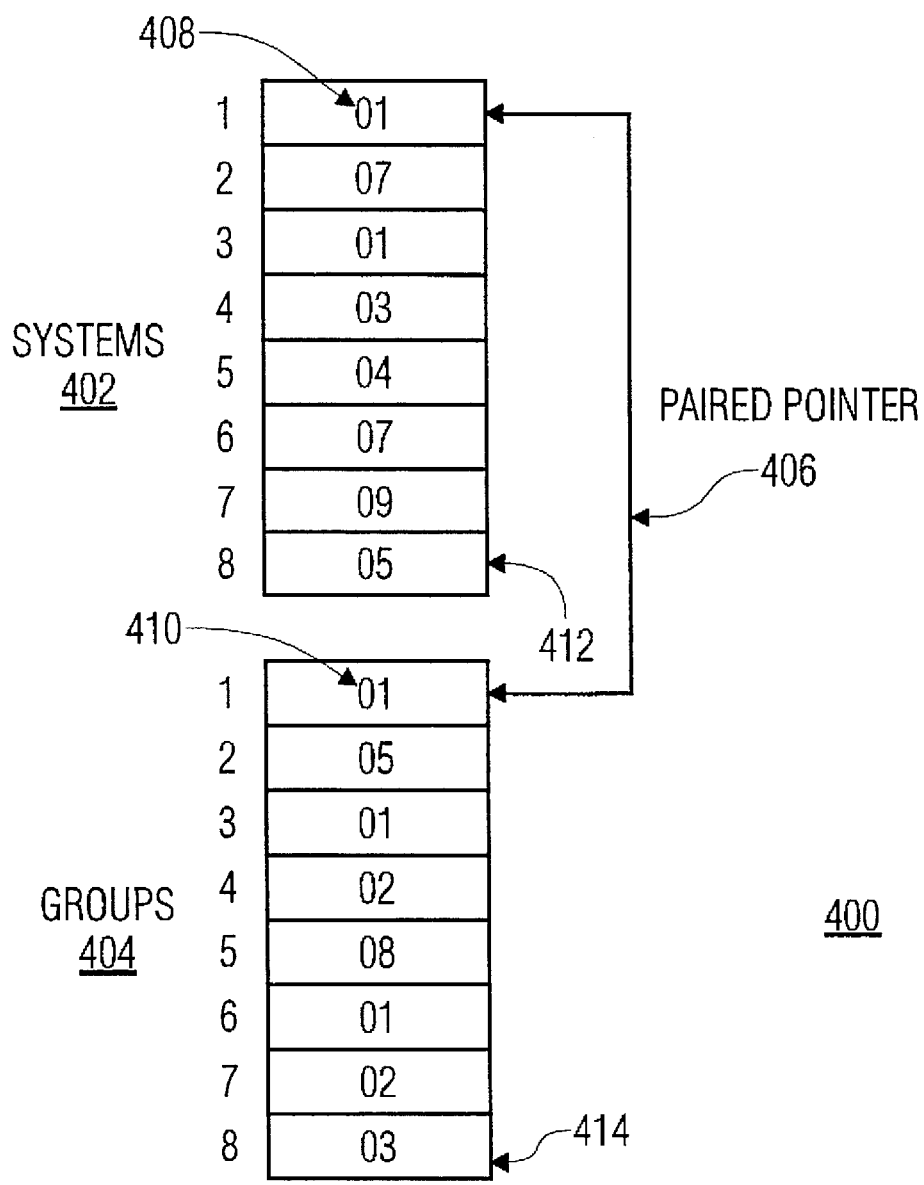
FIG. 4 is a memory diagram of the call history memory in the preferred embodiment.

FIG. 3B shows the data message packet which is transmitted by the radio to the repeater and therefore is the transmit call data message 316. The transmit call data message 316 includes a 9 bit "SYNC" field 318, a 1 bit "AREA" field 320, a 5 bit "IN-USE" field 322 which indicates the repeater number that a radio is currently transmitting on. The transmit call data message includes a similar 5 bit "HOME" repeater field 324 and a 8 bit "ID" field 326 which indicate, in combination, the transmit ID code being used by the radio at the time it initiates a call. In addition, the transmit call data message 316 includes a 5 bit "PASS" field 328 and a 7 bit "PARITY" field 330 as described earlier. Reference is directed to FIG. 4 which is a memory diagram of the call history memory 400 in the preferred embodiment. The call history memory 400 includes two blocks of eight memory storage locations each. The first block 402 is used to store eight system ID codes, and the second block 404 is used to store eight group ID codes. In FIG. 4, each of the eight system ID code memory locations and group ID code memory locations are identified by relative position numbers 1 through 8. The two memory sections 402 and 404 are linked together by a paired pointer 406 which is controlled by the software running in the controller and allows the coordinated storing and recalling of a pair of system ID code and group ID code. In FIG. 4 the pointer is presently indexing the first call history memory location wherein are stored system ID code "01" at 408 and group ID code "01" at 410. The memory is structured as a first in, first out queue, (FIFO), so that each time the controller pushes another pair of ID codes into the memory, each of the contents of the respective system ID code and group ID code storage location areas is pushed down one more memory location and the contents of system ID code memory location 8, 412 and group ID code location 8, 414 are pushed off the end of the queue and are lost. As the controller recalls system ID codes and group ID codes the contents of the storage locations which are presently pointed at by the paired pointer 406 are recalled. Later it will be seen that the position of the paired pointer 406 can be incremented through all eight storage locations and as such the controller is capable of recalling a pair of system ID code and group ID code from any of the eight paired storage locations.

Figure 5:
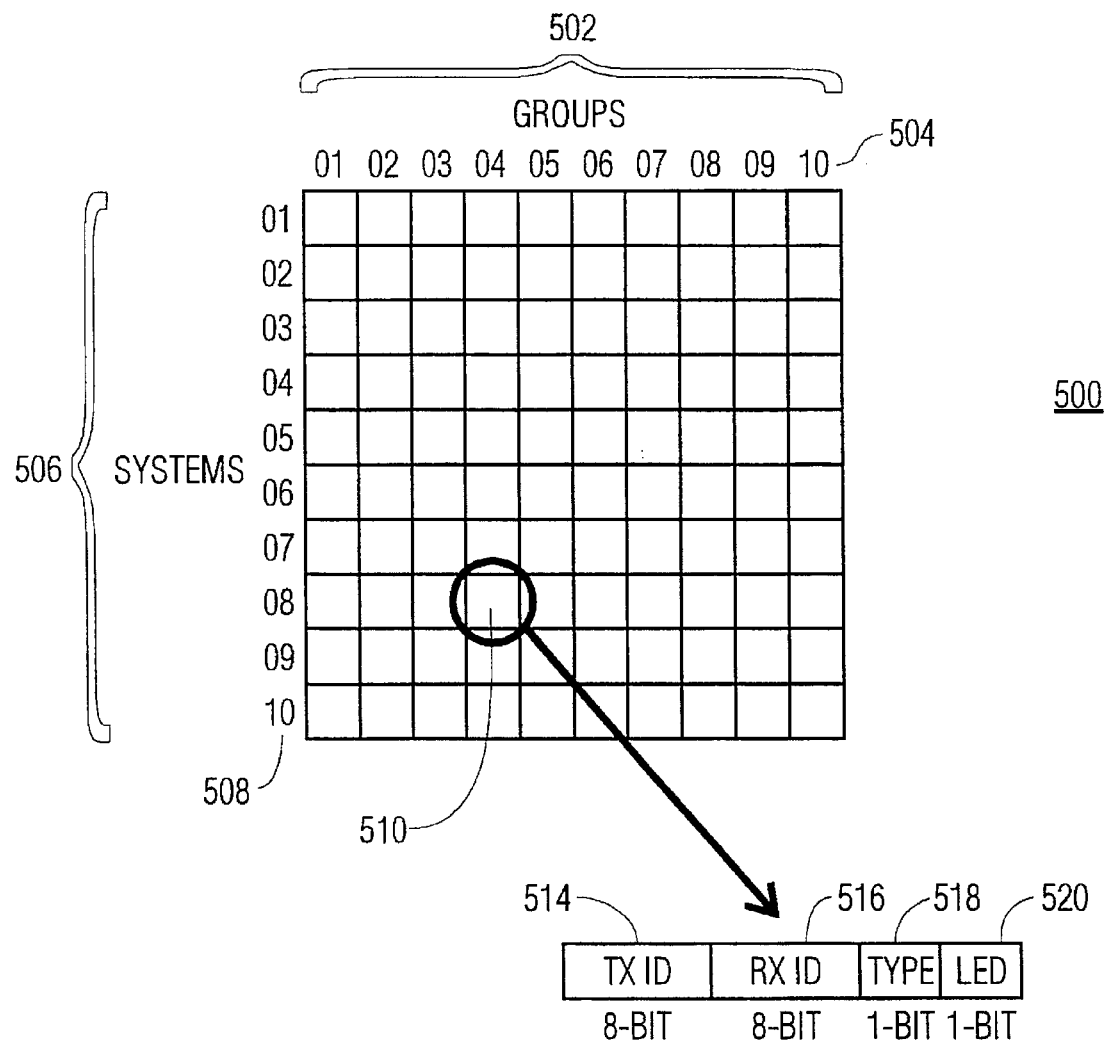
FIG. 5 is a memory diagram of the ID code memory in the preferred embodiment.

Reference is now directed to FIG. 5 which is a memory diagram of the ID code memory in the preferred embodiment. The ID code memory 500 is structured as a matrix with ten columns and ten rows. Of course, other sizes could be used, such as a 50 by 50 matrix, for example. The ten columns 502 identify ten group ID codes as indicated at 504. Similarly, the ten rows 506 identify the ten system ID codes as shown at 508. Any particular cell in the ID code memory 500 is identified by selecting a particular group ID code and a particular system ID code. In the example illustrated in FIG. 5, group ID code "04" and system ID code "08" are selected to identify cell 510. Within each cell are stored several data elements in memory storage locations. A transmit ID code 514, a receive ID code 516, a TYPE field 518, a LED field 520 are included in each cell.

In the preferred embodiment the transmit ID code 514 and the receive ID code 516 are used in the reception and transmission of call data messages by the two-way radio. It can be seen in FIG. 5 that in the case of transmitting a call data message the radio is given a system ID code and group ID code either entered from the user interface of the radio or recalled from the call history memory and these two ID's are used to define a cell in the ID code memory which identifies memory storage locations of a specific transmit ID code that is used to create a transmit call data message to initiate a call. Alternatively, when a call data message is received by the radio and a current receive ID code is decoded, the current receive ID code and the known current system ID code can be used to determine on which group ID code the particular receive ID code has been received.

Another aspect of the ID code memory is that for each particular system ID code and group ID code that is selected, there can be a different transmit ID code and receive ID code, or alternatively, the two ID's could be identical.

Figure 6:
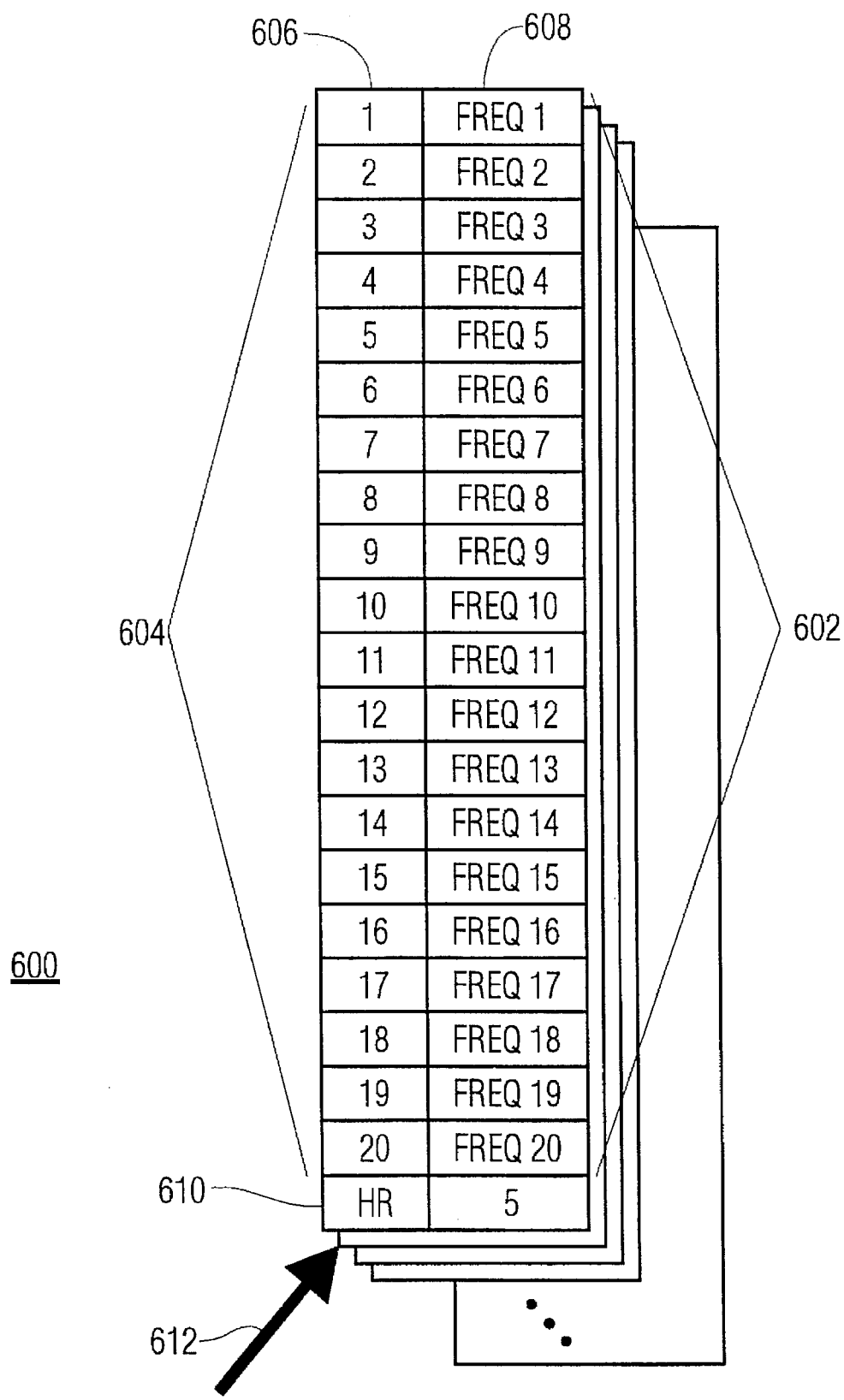
FIG. 6 is a memory diagram of the system information memory in the preferred embodiment.

Reference is now directed to FIG. 6 which is a memory diagram for the system information memory in the preferred embodiment. The system information memory 600 includes a plurality of memory tables. Each memory table includes up to 20 indicia of frequencies 602. Each indicia of frequency is linked to a repeater number 604. For example, repeater number 1 606 is linked to indicia of frequency number 1 608. Also, for each system information memory table there exists an additional element called the home repeater element 610. The home repeater element is used to tell the radio which frequency to monitor in the standby state while a particular system has been selected. Also included, as a reference to the system information memory, is a pointer 612 which is used to indicate to the controller which system is currently selected. The pointer 612 is incrementally stepped through the memory tables in the system information memory while the radio is scanning systems. Alternatively, if a system is manually selected, then the pointer is stepped through each memory table in the system information memory as the system selection changes. Pointer 612 is identified by a current system ID number. Pointer 612 resides in the RAM memory as a variable and is accessed by the object code software executed by the controller.

Figure 7:
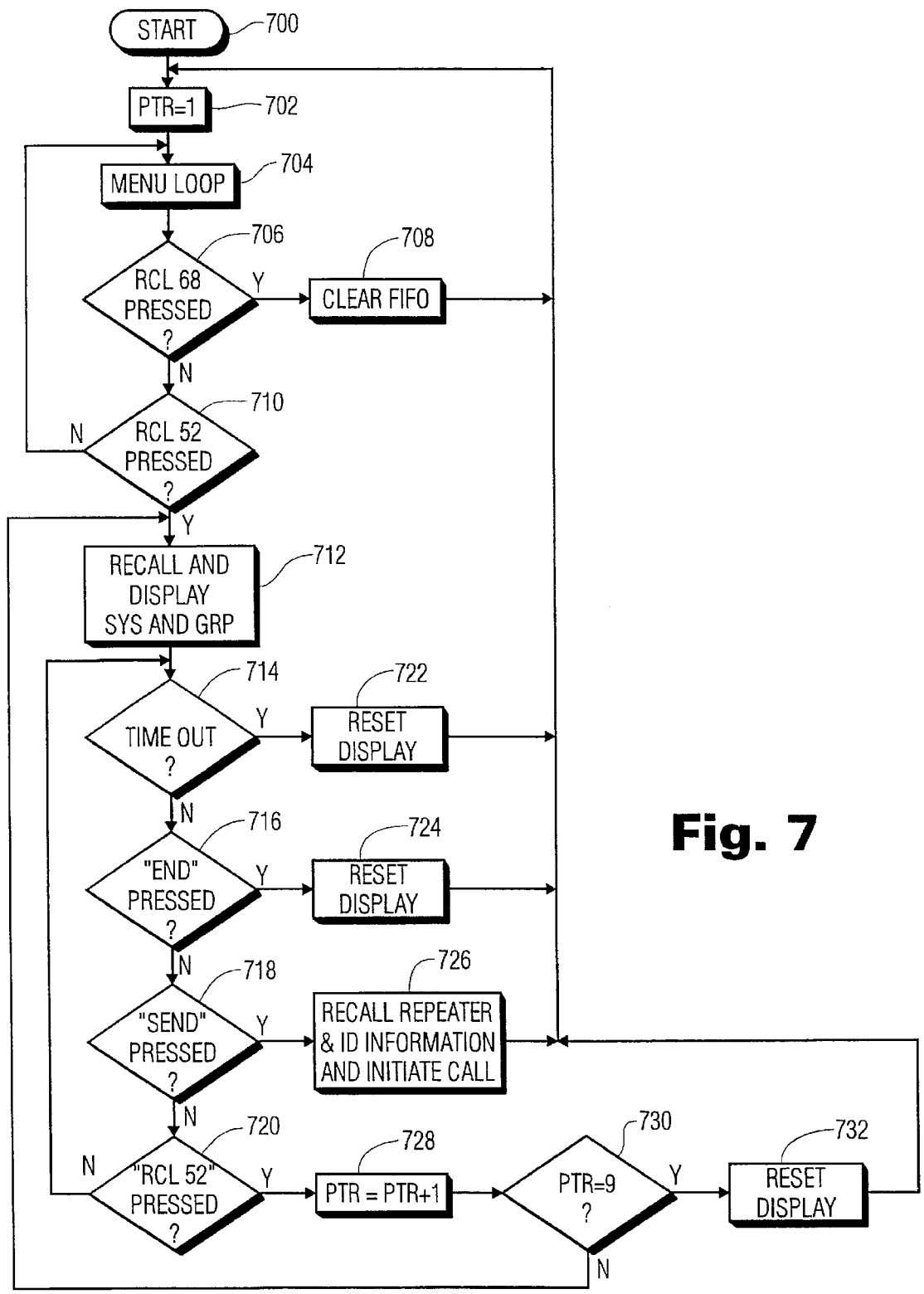
FIG. 7 is a software flow diagram of the call history memory recall, display, and initiate call function in the preferred embodiment.

Reference is now directed to FIG. 7 which is a software flow diagram of the call history memory recall, display, and initiate call functions in the present invention. The routine starts at step 700 where the controller sequences to step 702 and a pointer variable is set to equal 1, this pointer variable indicates the position of the paired pointer to the call history memory. The paired pointer is stored in the RAM memory as a variable and is accessed by the object code software executed by the controller. Next, the controller proceeds to step 704 which is a routine that is called the menu loop from which various other functions of the radio are called. These other functions are not relevant to the present invention. Next, at step 706 the controller tests to see if the recall 68 function has been pressed, if the recall 68 function has been pressed the controller proceeds to step 708 where it clears the call history memory FIFO queue and recirculates to step 702 where the pointer variable is again set equal to 1. The purpose of step 708 and the recall 68 function are to clear the recall history memory manually by the user. The recall 68 function is activated by pressing the "RCL" key followed by the "6" and "8" keys.

At step 706 if the recall 68 function has not been pressed, then the controller proceeds to step 710 where it tests to see if the recall 52 function has been pressed. The recall 52 function instructs the controller to recall the contents of the call history memory located at the memory locations identified by the paired pointer. If the recall 52 function has not been pressed at step 710 then the controller returns to the menu loop step at 704. As can be seen in FIG. 7, the controller continues to loop from step 704 to step 706 to step 710 and back again until some menu function is pressed. The recall 52 function is accessed by pressing the "RCL" key followed by the "5" and "2" keys.

If, at step 710, the recall 52 function is pressed then the controller proceeds to step 712 where it recalls the system ID code and group ID code that are stored in the call history memory and displays them on the display. The radio is now displaying the most recently received system ID code and group ID code from the call history memory. The controller now proceeds through a loop which includes steps 714, step 716, 718 and 720. At any one of these steps an event can occur which causes the controller to leave the loop comprised of step 714 through 720. If at step 714 a timer has timed out and the user has taken no action then the controller resets the display at step 722 which returns the radio back to a standby state and the flow of the software recirculates back to step 702. Alternatively, at step 716 if the user has pressed the "END" key on the radio then likewise the controller resets the display at step 724, returns to the standby state and recircutates to step 702.

If at step 718 the "SEND" key is pressed indicating that the user desires to respond to the call currently displayed as a system ID code and a group ID code then the controller proceeds to step 726 where the system ID code is used to indicate the system pointer in the system information memory which indicates memory table and the home repeater frequency for the system on which the reply call is to be placed. In a similar fashion the system ID code and group ID code information which have been recalled from the call history memory are used as reference points in the ID code memory to search for and recall the reply transmit ID code to be associated with the reply call. Since the transmit frequency is known and also the transmit ID code, the controller assembles a transmit call data message and initiates the transmission of the call. Upon completion of the call, control recirculates from step 726 to step 702 where the controller returns to the main menu loop waiting for another command to occur.

Returning to step 718 if the "SEND" function has not been pressed then the controller proceeds to step 720 where the recall 52 function may be pressed again with respect to the loop of step 714 through 720. If the recall 52 function is pressed again at step 720 then the controller increments the pointer variable by one at step 728. Incrementing the pointer at step 728 increments the paired pointer in the call history memory to cause the controller to recall and the display to display the next system ID code and group ID code stored in the call history memory. Next at step 730 the controller tests to see if the pointer variable is now equal to 9, if the pointer variable is not equal to 9, then the flow recirculates to step 712 where the controller recalls the system ID code and group ID code stored in the call history memory at the location pointed to by the paired pointer variable and displays them on the display. The controller then proceeds to the loop formed by step 714 through 720 to again wait for one of the actions therein to occur.

Alternatively, at step 730 if the pointer variable is equal to 9 then the controller resets the display at step 732 and recirculates to step 702 where it again enters the main menu loop. The purpose of the test at step 730 is to determine if the paired pointer has been indexed through all eight storage locations in the call history memory. If that is the case then the user of the radio has reviewed all eight pairs of system ID codes and group ID codes and has not initiated a reply call to any of those system ID code and group ID code combinations, and therefore the software returns the radio to the normal standby state. If the user would desire to again review the contents of the call history memory the recall 52 function could again be pressed and at step 710 it would initiate another cycle of indexing through the entire contents of the call history memory. As can be seen by studying the software flow diagram in FIG. 7 the flow allows the user to selectively recall various system ID codes and group ID codes which have been stored in the call history memory and make a decision to place a reply call to those ID codes at the user's option. Alternatively, the user can clear the call history memory if he so chooses or simply return to the main menu loop. The foregoing sequence provides a convenient user interface for the recollection and manipulation of the contents of the call history memory. Of course alternative user interfaces could be envisioned which accomplish substantially the same tasks.

While the preferred embodiment practices the present invention in a two-way radio that employs a plurality of systems, it is also useful to practice the invention in a radio which operates with one system. In a single system radio it is not necessary to employ a system ID code. Rather, the group ID code is used in the memory and software flow structures. The tasks executed by the controller are, of course, simplified.

Figure 8:
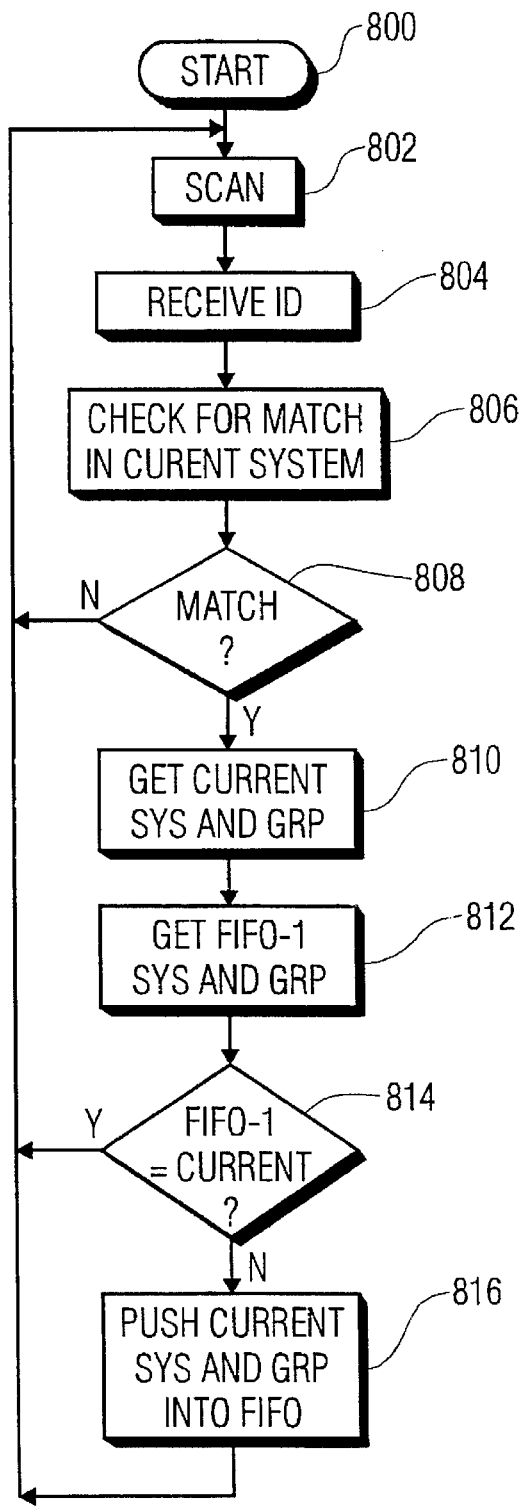
FIG. 8 is a software flow diagram of the call history memory storage routine in the preferred embodiment.

Reference is now directed to FIG. 8 which is a software flow diagram of the call history memory storage routine in the present invention. This routine is executed by the controller and causes the controller to sequentially store call history information into the call history memory in the form of system ID codes and group ID codes.

The routine starts at step 800, the controller proceeds to step 802 where the radio scans for the reception of a call data message. At step 804, the controller receives and decodes a current receive ID. At step 806 the controller uses the current system pointer as an index in the ID code memory to scan across the various group ID codes searching for a receive ID in the ID code memory that is equal in value to the current received ID code in step 804. If a match is found at any of the locations in the ID code memory, at step 808 the controller proceeds to step 810. Alternatively, if no match is found at step 808 then the controller recirculates at step 802 where it again continues to scan for the receipt of a call data message and subsequent receive ID code.

Returning to step 808 if a match is found then the controller at step 810 uses the current system pointer and the current received ID code to determine the current group ID code of the current receive ID code from the ID code memory. At this point the controller has both the current system ID and current group ID. Next, the controller proceeds to step 812 where it recalls the contents of the call history memory which are stored in the first location, this is the FIFO queue's most recent entry. This information indicates the group ID codes and system ID code of the call most recently stored in the call history memory. Those quantities are compared with the current system and group information at step 814. If these numbers are equal in value, then the current call has been received on the same system ID code and group ID code as the most recently stored call and therefore it would be redundant to store them in the call history memory, so from step 814 the flow recirculates to step 802 where the controller again scans for the receipt of a call data message.

Alternatively, at step 814 if the most recently stored system ID code and group ID code do not equal the current system ID code and current group ID code, then the controller proceeds to step 816 where it pushes the values of the current system ID code and current group ID code into the FIFO queue of the call history memory. This information has then been stored for later recollection by the user and the controller recirculates to step 802 where it again scans for receipt of another data message. The sequence of steps in FIG. 8 allow for the automatic reception, comparison, and storage of group ID codes and system ID codes based on the current receive ID code received in a call data message and the current system pointer within the scanning algorithm of the radio. Since the call history memory is arranged as a FIFO queue, the sequence of events in FIG. 8 can continue indefinitely wherein new calls are always pushed into the FIFO queue and the addition of each new call causes the eighth oldest call to drop-off the end of the queue. In this way, anytime the user desires to look at the calls historically received, they will always be able to look at the eighth most recently received calls. Of course, the size of the FIFO queue of the call history memory could be expanded to a greater number of calls. However, there is a point of diminishing returns in terms of usefulness to the user of the radio.

While the foregoing specification and drawings enable those skilled in this and related arts to practice the present invention in accordance with the preferred embodiment, the claimed invention encompasses a broader scope. Further modifications and improvements may occur which will make obvious manifold variants of the present invention. The claims appended hereunto are intended to read upon all such variants.

What is claimed is:

1. A method of storing call history information in a memory in a radio system that identifies transmitted and received radio signals with call data messages, comprising the steps of:

receiving a call data message;

decoding a receive ID code from said call data message;

identifying a current group ID code that is linked to said receive ID code in an ID code memory being suitable for storing a plurality of receive ID codes, a plurality of transmit ID codes, and a plurality of group ID codes, wherein each one of said plurality of group ID codes is linked to at least one of said plurality of receive ID codes and at least one of said plurality of transmit ID codes;

storing said current group ID code in a call history memory.

2. The method of claim 1, wherein said ID code memory further stores a plurality of system ID codes and wherein said receive ID code is linked to a current system ID code in said ID code memory, and further comprising the steps of:

further identifying said current group ID code based on a linked relationship between said receive ID code and said current system ID code in said ID code memory, and storing said current system ID code in said call history memory, wherein said current group ID code and said current system ID code are linked together.

3. The method of claim 2, further comprising the steps of:

selecting a reply group ID code and a reply system ID code, that are linked together, from said call history memory;

identifying a reply transmit ID code, in said ID code memory, that is linked to said reply group ID code and said reply system ID code;

recalling said reply transmit ID code;

encoding said reply transmit ID code into a reply call data message, and sending said reply call data message.

4. The method of claim 1, further comprising the steps of:

selecting a reply group ID code from said call history memory;

identifying a reply transmit ID code that is linked to said reply group ID code in said ID code memory;

recalling said reply transmit ID code;

encoding said reply transmit ID code into a reply call data message, and sending said reply call data message.

5. A method of storing call history information in a memory in a radio system that identifies transmitted and received radio signals with call data messages, comprising the steps of:

receiving a call data message;

decoding a receive ID code from said call data message;

identifying a current group ID code that is linked to said receive ID code in an ID code memory for storing a plurality of receive ID codes, a plurality of transmit ID codes, and a plurality of group ID codes, wherein each one of said plurality of group ID codes is linked to at least one of said plurality of receive ID codes and one at least one of said plurality of transmit ID codes;

comparing the value of said current group ID code with the value of a first group ID code stored in a call history memory, and upon finding unequivalence storing said current group ID code in said call history memory.

6. The method of claim 5, wherein said ID code memory further stores a plurality of system ID codes and wherein said receive ID code is linked to a current system ID code in said ID code memory, and further comprising the steps of:

further identifying said current group ID code based on a linked relationship between said receive ID code and said current system ID code in said ID code memory, and further comparing the value of said current system ID code with the value of a first system ID code, stored in said call history memory, that is linked to said current group ID code, and further upon finding unequivalence storing said current system ID code in said call history memory, wherein said current group ID code and said current system ID code are linked together.

7. The method of claim 6, further comprising the steps of:

selecting a reply group ID code and a reply system ID code, that are linked together, from said call history memory;

identifying a reply transmit ID code, in said ID code memory, that is linked to said reply group ID code and said reply system ID code;

recalling said reply transmit ID code;

encoding said reply transmit ID code into a reply call data message, and sending said reply call data message.

8. The method of claim 5, further comprising the steps of:

selecting a reply group ID code from said call history memory;

identifying a reply transmit ID code, that is linked to said reply group ID code, in said ID code memory;

recalling said reply transmit ID code;

encoding said reply transmit ID code into a reply call data message, and sending said reply call data message.

9. A two-way radio, comprising:

a transceiver, having a receiver portion for receiving call data messages;

an ID code memory comprising a plurality of storage locations for storing receive ID codes and a plurality of storage locations for storing group ID codes, wherein each one of said plurality of storage locations for storing group ID codes is linked to at least one of said plurality of storage locations for storing receive ID codes;

a call history memory having a plurality of storage locations for storing group ID codes;

a controller coupled to said transceiver for receiving call data message therefrom, said controller operable to extract a current receive ID code from a current call data message upon receipt of said current call data message from said transceiver, said controller coupled to said ID code memory and operable to search said plurality of storage locations for a receive ID code stored therein that is equal in value to said current receive ID code, and upon finding said receive ID code that is equal in value, recalling a current group ID code from the one of said plurality of storage locations that is linked to the storage location storing said equal receive ID code, said controller being coupled to said call history memory, and said controller operable to store said current group ID code in one of said plurality of storage locations in said call history memory.

10. The two-way radio of claim 9, further comprising:

a first actuator coupled to said controller wherein actuation of said first actuator causes said controller to recall a reply group ID code for one of said plurality of storage locations in said call history memory;

a display coupled to said controller, said display being suitable for displaying said reply group ID code, said controller operable to display said reply group ID code upon recalling said reply group ID code from said call history memory;

and wherein said ID code memory comprises a plurality of storage locations for storing transmit ID codes, and wherein each one of said plurality of storage locations for storing group ID codes is linked to at least one of said plurality of storage locations for storing transmit ID codes;

a second actuator coupled to said controller wherein actuation of said second actuator caused said controller to search said plurality of storage locations in said ID code memory for a group ID code stored therein that is equal in value to said reply group ID code, and upon finding the equal group ID code, recalling a reply transmit ID code from one of said plurality of storage locations in said ID code memory that is linked to the one of said plurality of storage locations storing the equal group ID code, said controller further operable to encode said reply transmit ID code into a reply call data message upon actuation of said second actuator and couple said reply call data message to a transmitter portion of said transceiver.

11. The two-way radio of claim 10 wherein;

subsequent actuations of said first actuator causes said controller to recall subsequent ones of said group ID codes stored in said plurality of storage locations in said call history memory as subsequent reply group ID codes.

12. The two-way radio of claim 11 wherein said call history memory is a first-in, first-out queue.

13. A two-way radio, comprising:

a transceiver, having a receiver portion for receiving call data messages;

a system information memory for storing a plurality of indicia of radio frequencies, said system information memory having a pointer thereto for identifying a current system and a current indicia of radio frequency in accordance with a current system ID code;

an ID code memory comprising a plurality of storage locations for storing receive ID codes and a plurality of storage locations for storing group ID codes and a plurality of storage locations for storing system ID codes, wherein each one of said plurality of storage locations for storing group ID codes is linked to at least one of said plurality of storage locations for storing receive ID codes;

a call history memory having a plurality of storage locations for storing group ID codes and a plurality of storage locations for storing system ID codes;

a controller coupled to said transceiver for receiving call data message therefrom, said controller operable to extract a current receive ID code from a current call data message upon receipt of said current call data message from said transceiver, said controller coupled to said ID code memory and operable to search said plurality of storage locations for a storage location having a receive ID code of equal value to said current receive ID code stored therein, and said storage location being linked to both of a first one of said plurality of storage locations having a system ID code stored therein that is equal to said current system ID code and a second one of said plurality of storage locations having a current group ID code, and upon finding said storage location having a receive ID code of equal value stored therein, recalling said current group ID code from the one of said plurality of storage locations that is linked to the storage location storing said receive ID code of equal value, said controller being coupled to said call history memory, and said controller operable to store said current group ID code and said current system ID code in a linked pair of said plurality if storage locations in said call history memory.

14. The two-way radio of claim 13, further comprising:

a first actuator coupled to said controller wherein actuation of said first actuator causes said controller to recall a reply group ID code and a reply system ID code which are stored in a linked pair of said plurality storage locations in said call history memory;

a display coupled to said controller, said display being suitable for displaying said reply group ID code and said reply system ID code, said controller operable to display said reply group ID code and said reply system ID code upon recollection thereof from said call history memory;

and wherein said ID code memory comprises a plurality of storage locations for storing transmit ID codes, and wherein each one of said plurality of storage locations for storing transmit ID codes is linked to one of said plurality of storage locations for storing group ID codes and further linked to one of said plurality of storage locations for storing system ID codes;

a second actuator coupled to said controller wherein actuation of said second actuator causes said controller to search said plurality of storage locations in said ID code memory for a storage location having a group ID code stored therein that is equal in value to said reply group ID code and further search said plurality of storage locations in said ID code memory for a storage location having a system ID code equal to said reply system ID code, and upon finding the equal group ID code and equal system ID code, recalling a reply transmit ID code from the one of said plurality of storage locations in said ID code memory that is linked to both of said storage location having a group ID code stored therein that is equal in value to said reply group ID code, and said storage location having a system ID code equal to said reply system ID code, said controller being operable to adjust said pointer, to said system information memory, in accordance with said current system ID code, and recall a current indicia of frequency, and further adjust a frequency of operation of said transceiver in accordance with said current indicia of frequency;

said controller further operable to encode said reply transmit ID code into a reply call data message upon actuation of said second actuator and couple said reply call data message to a transmitter portion of said transceiver.

15. The two-way radio of claim 14 wherein;

subsequent actuations of said first actuator causes said controller to recall subsequent ones of said group ID codes and system ID codes stored in said plurality of storage locations in said call history memory as subsequent reply group ID codes and system ID codes.

16. The two-way radio of claim 15 wherein said call history memory is a first-in, first-out queue.

17. A two-way radio, comprising:

a radio frequency transceiver that encodes and decodes data messages;

a ID code memory for storing a plurality of transmit ID codes and a plurality of receive ID codes which are organized by system ID codes and group ID codes such that each combination of one system ID code and one group ID code specifies at least one of said plurality of transmit ID codes and at least one of said plurality receive ID codes;

a system information memory for storing a plurality of indicia of radio frequencies, each of said plurality of indicia of radio frequencies being linked to a repeater number, said system information memory being subdivided into a plurality of systems wherein each of said systems is associated with a home repeater identifier, and each of said systems is identified by a system ID code, said system information memory comprising a current system pointer for pointing to one of said system ID codes, thereby defining a current system;

a call history memory for storing a plurality of system ID codes and a plurality group ID codes, wherein each one of said plurality of system ID codes is linked to one of said plurality of group ID codes;

a keypad having at least a first key and a second key, each of said keys being actuatable to an active state;

a display having an input for receiving commands and being operable to display said system ID codes and said group ID codes; and a controller coupled to said transceiver for controlling said transceiver and for receiving data messages therefrom and sending data message thereto, said controller coupled to said ID code memory and operable to recall any of said receive ID codes or transmit ID codes according to a specific pair of one of said group ID codes and one of said system ID codes, said controller coupled to said system information memory and operable to recall said current system pointer, said controller coupled to said call history memory and being operable to write and read said system ID codes and said group ID codes to and therefrom, said controller coupled to said keypad and operable to detect the actuation of said first and said second keys, said controller coupled to said input of said display and operable to output said system ID codes and said group ID codes, and wherein receipt of a data message from said transceiver causes said controller to extract a receive ID code from said data message and recall said current system pointer from said system information memory, and further, to search said ID code memory for a matching group ID code stored in accordance with said extracted received ID code and said current system pointer, and recalling said matching group ID code, and said controller further comparing said current system pointer and said matching group ID code with a first system ID code and a first group ID code stored in said ID code memory, and, upon finding unequivalence thereto, storing said current system pointer and said matching group ID code in said call history memory.

\* \* \* \* \*